US012701611B2

(12) United States Patent (10) Patent No.: US 12,701,611 B2
Max et al. (45) Date of Patent: Aug. 4, 2026

(54) TRIGGER FRAME SCHEDULE INDICATION

(71) Applicant: Telefonaktiebolaget LM Ericsson (publ), Stockholm (SE)

(72) Inventors: Sebastian Max, Cologne (DE); Jonas Sedin, Brentford (GB); Guido Roland Hiertz, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 340 days.

(21) Appl. No.: 18/270,876

(22) PCT Filed: Jan. 7, 2022

(86) PCT No.: PCT/EP2022/050245
§ 371 (c)(1),
(2) Date: Jul. 5, 2023

(87) PCT Pub. No.: WO2022/148831
PCT Pub. Date: Jul. 14, 2022

(65) Prior Publication Data
US 2024/0090021 A1 Mar. 14, 2024

Related U.S. Application Data

(60) Provisional application No. 63/134,799, filed on Jan. 7, 2021.

(51) Int. Cl.
*H04W 74/0808* (2024.01)
*H04W 72/12* (2023.01)
(Continued)

(52) U.S. Cl.
CPC ....... *H04W 74/0808* (2013.01); *H04W 72/12* (2013.01); *H04W 74/006* (2013.01); *H04W 84/12* (2013.01)

(58) Field of Classification Search
CPC ..... H04W 72/12; H04W 72/23; H04W 74/02; H04W 74/0808; H04W 84/12
See application file for complete search history.

(56) References Cited

U.S. PATENT DOCUMENTS

2016/0219522 A1* 7/2016 Asterjadhi ........ H04W 52/0235
2016/0366701 A1 12/2016 Chu et al.
(Continued)

FOREIGN PATENT DOCUMENTS

CN 106922034 A 7/2017

OTHER PUBLICATIONS

Author Unknown, "Part 11: Wireless LAN Medium Access Control (MAC) and Physical Layer (PHY) Specifications," IEEE Standard 802.11-2016, Dec. 14, 2016, IEEE Standards Association 3,534 pages.

(Continued)

*Primary Examiner* — Pao Sinkantarakorn
(74) *Attorney, Agent, or Firm* — Withrow & Terranova, PLLC

(57) ABSTRACT

Embodiments of a method performed by wireless device are disclosed. In one embodiment, a method performed by a wireless device comprises receiving, from a wireless access point, information that indicates transmission times of one or more upcoming trigger frames (TFs). The method further comprises performing one or more actions based on the information that indicates the transmission times of the one or more upcoming TFs. In this manner, by knowing the transmission times of the one or more upcoming TFs, the wireless device is able to decide not to contend for the medium when it knows that it can fulfil traffic latency requirements (e.g., transmit uplink data within the required latency limit) by waiting for the upcoming TF(s). Corresponding embodiments of a wireless device are also dis- (Continued)

closed. Embodiments of a wireless access point and methods of operation thereof are also disclosed.

22 Claims, 9 Drawing Sheets

(51) Int. Cl.
  *H04W 74/00*        (2009.01)
  *H04W 84/12*        (2009.01)

(56)                References Cited

U.S. PATENT DOCUMENTS

| | | | | |
|---|---|---|---|---|
| 2017/0273140 A1* | 9/2017 | Ryu | ..................... | H04W 88/10 |
| 2017/0373736 A1* | 12/2017 | Fang | ..................... | H04W 74/06 |
| 2018/0014316 A1* | 1/2018 | Guo | ................. | H04W 52/0219 |
| 2018/0167882 A1* | 6/2018 | Choi | .................. | H04W 74/002 |
| 2019/0082468 A1 | 3/2019 | Ahn et al. | | |
| 2023/0199831 A1* | 6/2023 | Yang | .................... | H04W 74/02 |
| | | | | 370/329 |

OTHER PUBLICATIONS

International Search Report and Written Opinion for International Patent Application No. PCT/EP2022/050245, mailed Apr. 20, 2022, 8 pages.
First Office Action for Chinese Patent Application No. 202280009240.0, mailed Mar. 24, 2026, 28 pages.

\* cited by examiner

TRIGGER FRAME SCHEDULE INDICATION

This application is a 35 U.S.C. § 371 national phase filing of International Application No. PCT/EP2022/050245, filed Jan. 7, 2022, which claims the benefit of provisional application Ser. No. 63/134,799, filed Jan. 7, 2021, the disclosures of which are incorporated herein by reference in their entireties.

TECHNICAL FIELD

The present disclosure relates to uplink transmission in a wireless communication network.

BACKGROUND

In the Institute of Electrical and Electronics Engineers (IEEE) 802.11, stations (STA) are classified as access point stations (AP STA) or non-access point stations (non-AP STA). For ease of notation, and following common usage, in the present disclosure the term "AP" refers to an AP STA and the term "STA" refers a non-AP STA.

The amendment "ax" of the standard IEEE 802.11 introduces Orthogonal Frequency-Division Multiple Access (OFDMA) as a new option to access the channel. In contrast to the "old" medium access function where each STA decides by itself when to start the contention for the channel access, OFDMA transmissions are mainly controlled by the AP:

For downlink traffic, this is straightforward, as the AP simply schedules the downlink transmissions into different, frequency-separated resource units (RUs) and transmits them using one multi-user OFDMA frame to the associated STAs in parallel.

For uplink traffic, the AP first sends a trigger frame (TF) that indicates the following multi-user uplink OFDMA frame to the scheduled STAs, together with their transmission parameters (Resource Unit (RU), duration, Modulation and Coding Scheme (MCS), etc.). After the reception of the TF, the STAs reply with a special Trigger Based Physical layer Protocol Data Unit (TB-PPDU), using the indicated transmission parameters.

Amendment IEEE 802.11ax-2021 defines eight different TF variants to trigger different types of transmissions. For the present disclosure, the two relevant TF variants are the basic variant and the buffer status report poll (BSRP) variant. The first one is used to trigger any type of transmission and is mainly used for uplink data streams. The second one is used to poll buffer status reports (BSRs) such that the AP gains knowledge of the STA's transmission queue sizes and thus can schedule it appropriately for uplink data transmissions.

To be backwards compatible and to ensure fair coexistence with other users of the unlicensed spectrum, before each OFDMA frame exchange, the AP must contend for access to the wireless medium using the legacy listen-before-talk (LBT) based enhanced distributed channel access function (EDCAF) with exponential backoff.

SUMMARY

Embodiments of a method performed by wireless device are disclosed. In one embodiment, a method performed by a wireless device comprises receiving, from a wireless access point, information that indicates transmission times of one or more upcoming trigger frames (TFs). The method further comprises performing one or more actions based on the information that indicates the transmission times of the one or more upcoming TFs. In this manner, by knowing the transmission times of the one or more upcoming TFs, the wireless device is able to decide not to contend for the medium when it knows that it can fulfil traffic latency requirements (e.g., transmit uplink data within the required latency limit) by waiting for the upcoming TF(s). Therefore, the wireless access point has the full power over the scheduling of wireless transmissions, which is crucial for hard quality of service guarantees and for system-wide optimal resource usage.

In one embodiment, the wireless device is an IEEE 802.11 STA, and the wireless access point in an IEEE 802.11 AP.

In one embodiment, the information that indicates the transmission times of the one or more upcoming TFs comprises additional information that indicates a traffic category polled by at least one of the one or more upcoming TFs.

In one embodiment, performing the one or more actions based on the information that indicates the transmission times of the one or more upcoming TFs comprises making a decision as to whether to transmit data using a listen before talk (LBT) medium access scheme or trigger-based medium access scheme (e.g., an Orthogonal Frequency Division Multiple Access (OFDMA) scheme) that uses a trigger frame, based on the information that indicates the transmission times of the one or more upcoming TF (e.g., based on when a next trigger frame is scheduled in accordance with the information that indicates the transmission times of the one or more upcoming TFs), and transmitting the data in accordance with the decision. In one embodiment, the wireless device is an IEEE 802.11 STA, the wireless access point is an IEEE 802.11 AP, the LBT-based medium access scheme is Enhanced Distributed Channel Access Function (EDCAF), and the trigger-based medium access scheme is an OFDMA-based scheme, e.g., Uplink OFDMA (UL-OFDMA).

In one embodiment, the information that indicates the transmission times of the one or more upcoming TFs comprises a time offset between a time at which the information is received and a transmission time of a next upcoming TF.

In one embodiment, the information that indicates the transmission times of the one or more upcoming TFs comprises a time interval between subsequent TFs.

In one embodiment, the information that indicates the transmission times of the one or more upcoming TFs comprises additional information about the one or more upcoming trigger frames. In one embodiment, the additional information comprises random access RUs of at least one of the one or more the upcoming trigger frames. In one embodiment, information that indicates the transmission times of the one or more upcoming TFs comprises traffic category polled by or allocation of uplink RUs for at least one of the one or more upcoming trigger frames. In one embodiment, the additional information comprises information that indicates one or more wireless devices that will be polled by at least one of the one or more upcoming TFs.

In one embodiment, receiving the information that indicates the transmission times of the one or more upcoming TFs comprises receiving a broadcast message from the wireless access point, the broadcast message comprising the information that indicates the transmission times of the one or more upcoming TFs.

In one embodiment, receiving the information comprises receiving a TF from the wireless access point, the TF comprising the information that indicates the transmission times of the one or more upcoming TFs.

In one embodiment, the information that indicates the transmission times of the one or more upcoming TFs comprises information about one or more upcoming TFs that are intended for the wireless device. In one embodiment, information that indicates the transmission times of the one or more upcoming TFs comprises information about only upcoming trigger frames that are scheduled to be transmitted to the wireless device.

Corresponding embodiments of a wireless device are also disclosed.

Embodiments of a method performed by a wireless access point are also disclosed. In one embodiment, a method performed by a wireless access point comprises transmitting, to a wireless device, information that indicates transmission times of one or more upcoming trigger frames.

In one embodiment, the wireless device is an IEEE 802.11 STA, and the wireless access point in an IEEE 802.11 AP.

In one embodiment, the information that indicates the transmission times of the one or more upcoming TFs comprises additional information that indicates a traffic category polled by at least one of the one or more upcoming TFs.

In one embodiment, the information that indicates the transmission times of the one or more upcoming TFs is to be used by the wireless device when assessing whether to transmit data using an LBT-based medium access scheme (e.g., EDCAF) or trigger-based medium access scheme (e.g., an UL-OFDMA scheme) that uses a trigger frame.

In one embodiment, the information that indicates the transmission times of the one or more upcoming TFs comprises a time offset between a time at which the information is received and a transmission time of a next upcoming TF.

In one embodiment, the information that indicates the transmission times of the one or more upcoming TFs comprises a time interval between subsequent TFs.

In one embodiment, the information that indicates the transmission times of the one or more upcoming TFs comprises additional information about the one or more upcoming trigger frames. In one embodiment, the additional information comprises random access RUs of at least one of the one or more upcoming trigger frames. In one embodiment, the additional information comprises traffic category polled by or allocation of uplink RUs for at least one of the one or more upcoming trigger frames. In one embodiment, the additional information comprises information that indicates one or more wireless devices that will be polled by at least one of the one or more upcoming TFs.

In one embodiment, transmitting the information that indicates the transmission times of the one or more upcoming TFs comprises transmitting the information that indicates the transmission times of the one or more upcoming TFs in an information within a broadcast message (e.g., a beacon) transmitted by the wireless access point.

In one embodiment, transmitting the information that indicates the transmission times of the one or more upcoming TFs comprises transmitting the information that indicates the transmission times of the one or more upcoming TFs in a trigger frame.

In one embodiment, transmitting the information that indicates the transmission times of the one or more upcoming TFs comprises transmitting signaling that is individually transmitted to the wireless device, the signaling comprising the information that indicates the transmission times of the one or more upcoming TFs.

In one embodiment, the information that indicates the transmission times of the one or more upcoming TFs comprises information about one or more upcoming TFs that are intended for the wireless device. In one embodiment, information that indicates the transmission times of the one or more upcoming TFs comprises information about only upcoming trigger frames that are scheduled to be transmitted to the wireless device.

Corresponding embodiments of a wireless access point are also disclosed.

Certain embodiments may provide one or more of the following technical advantage(s). For example, if a STA knows the time of the next TF, it is able to decide not to contend for the medium as it knows that it can fulfil the traffic latency requirements (e.g., transmit uplink data within the required latency limit) by waiting for the TF. Therefore, the AP has the full power over the scheduling of wireless transmissions, which is crucial for hard quality of service guarantees and for system-wide optimal resource usage.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
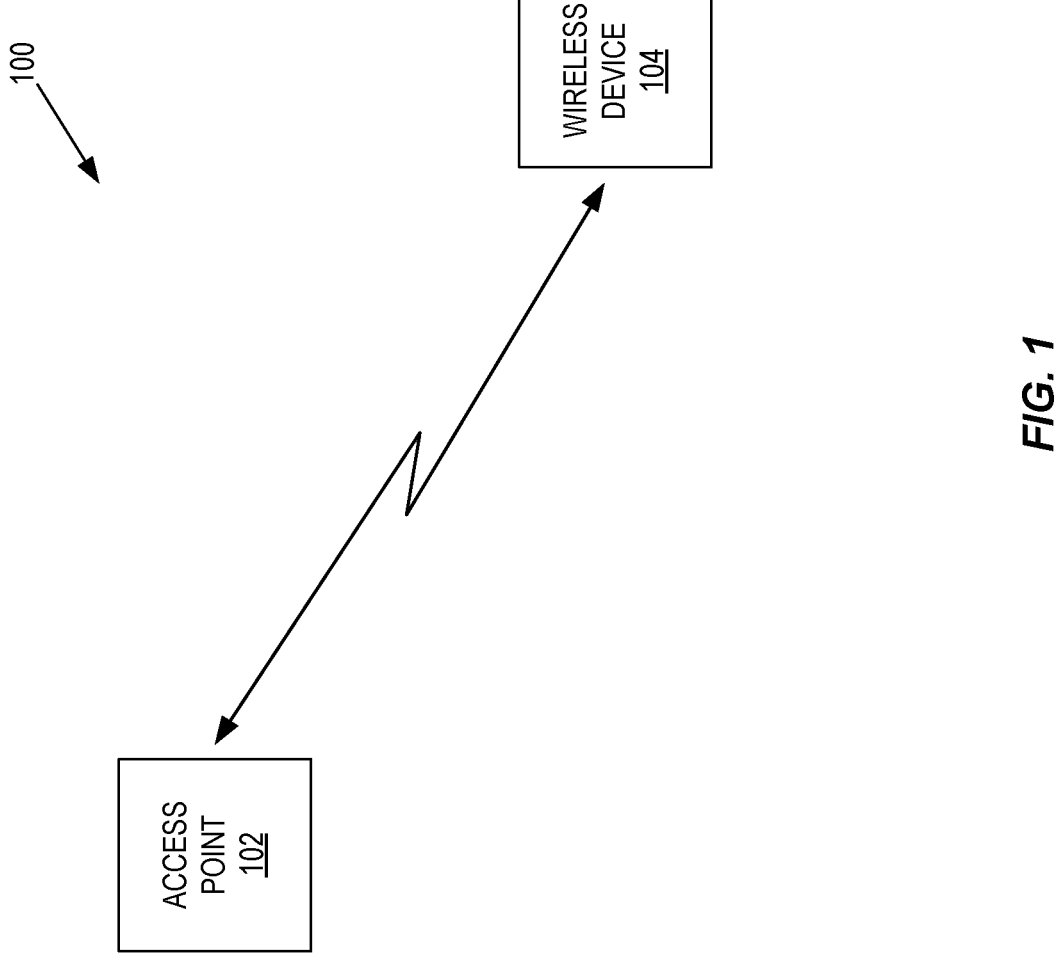
FIG. 1 illustrates one example of a wireless communication network in which embodiments of the present disclosure may be implemented

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either an access point or a wireless device.

Wireless Access Point: As used herein, a "wireless access point" is a network node that provides wireless access in a wireless communication network such as, but not limited to, an Institute of Electrical and Electronics Engineers (IEEE) 802.11 network or a Third Generation Partnership Project (3GPP) radio access network. As used herein, an "access point", "AP", or "IEEE AP" is an IEEE 802.11 AP STA and is one type of "wireless access point". Another example type of wireless access point is a 3GPP radio access node (e.g., a New Radio (NR) base station (gNB)).

Wireless Device: As used herein, a "wireless device" is any type of device that has wireless access to a wireless communication network such as, e.g., an IEEE 802.11 network or a 3GPP radio access network. As used herein, a "STA" or "IEEE STA" is one type of wireless device and refers to a non-AP STA in IEEE 802.11. Some examples of a wireless communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate data via a wireless connection.

Note that the description given herein focuses on an IEEE 802.11 network and, as such, IEEE 802.11 terminology or terminology similar to IEEE 802.11 terminology is often-times used. However, the concepts disclosed herein are not limited to an IEEE 802.11 network and may be applied to any type of wireless communication network in which a wireless device accesses whether to transmit data using a trigger-based medium access scheme (e.g., a trigger based OFDMA scheme which is the focus of the description below) or an LBT-based scheme.

There currently exist certain challenge(s). In principle, the IEEE 802.11ax OFDMA allows the AP to centrally schedule all uplink and downlink transmissions from and to its associated STAs such that the traffic latency requirements are met; therefore, it supports hard quality of service require-ments. This is a major achievement, as this is not possible with the randomized enhanced distributed channel access function (EDCAF). However, this relies on two conditions: (1) that the channel is not shared with other APs which also contend for the channel to serve their associated STAs and (2) that the associated STAs refrain from accessing the medium using the EDCAF but wait for their resources as indicated in the TF. To increase the probability for the second condition, the AP is able to indicate an EDCAF parameter set for its associated STAs that increases the contention window to the maximum value. This lowers the aggressiveness of the STAs to attempt to access the channel but does not necessarily stop them.

Another existing option for the AP is to try to negotiate power save intervals with its STAs using IEEE 802.11ax target wake time (TWT) such that the STAs contend for the channel only a fraction of the time, and schedule appropriate TFs at the start of each wake interval. This approach depends on the capability of the STAs to perform TWT, plus it is the STA's decision to accept the TWT.

As an example of the problem, when a STA receives data to transmit in the uplink, it would have to decide whether to utilize EDCAF to transmit its data or to wait for a TF. Utilizing EDCAF might incur lower latencies if the TF period is not frequent enough but causes system-wide deg-radation. If the STA decides to wait for a TF, the STA does not know when this will arrive.

Certain aspects of the present disclosure and their embodiments may provide solutions to the aforementioned or other challenges. Systems and methods are disclosed herein in which, instead of relying on implicit methods (EDCAF parameters, TWT) to reduce the probability of a STA accessing the medium, the AP signals the next planned TF transmission time(s) (e.g., time(s) at which the next planned TF(s) is to be transmitted, which may be, for example, the start time(s) of the next planned TF(s)) to a STA.

FIG. 1 illustrates one example of a wireless communica-tion network 100 in which embodiments of the present disclosure may be implemented. In the embodiments described herein, the wireless network 100 is an IEEE 802.11 network; however, the embodiments described herein are not limited thereto. The wireless network 100 includes a wireless access point 102 and a wireless device 104. In the preferred embodiments described herein, the wireless access point 102 is an IEEE 802.11 AP and the wireless device 104 is an IEEE 802.11 STA and, as such, the wireless access point 102 is also referred to herein as an AP 102 and the wireless device 104 is also referred to herein as a STA 104. However, the present disclosure is not limited thereto.

Embodiments of the present disclosure provide mecha-nisms for the AP 102 to signal upcoming target TF trans-mission time(s) (TTTTs) to STAs including the STA 104.

Figure 2:
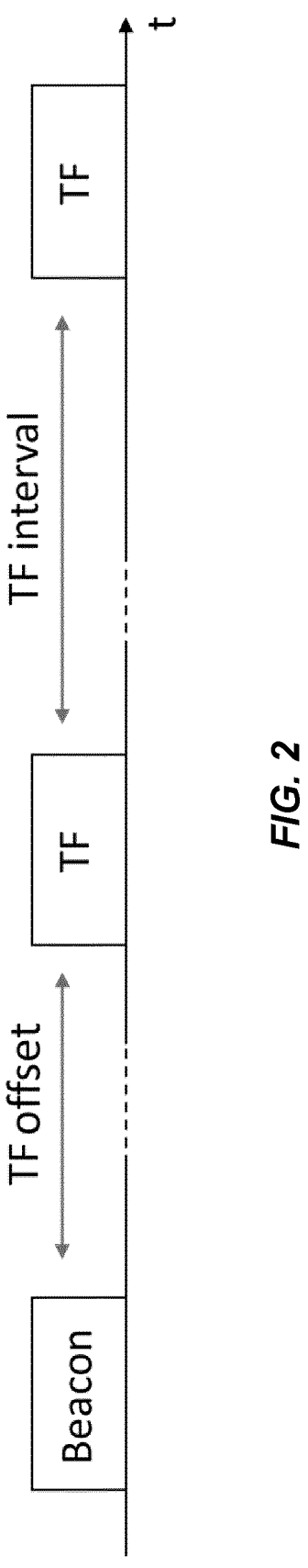
FIG. 2 illustrates one example of Trigger Frame (TF) schedule information in accordance with an embodiment of the present disclosure.

In a first embodiment, the AP 102 includes a TF sched-uling information (e.g., a TF scheduling information ele-ment or in other words an information element including TF scheduling information) in its beacon. Note that "TF scheduling information" may also be referred to as "TF schedule information" or "information that indicates transmission times of one or more upcoming TFs." The format of the IEEE 802.11 beacon (i.e., the IEEE 802.11 beacon frame format) is well-known to those of skill in the art and is not repeated here. In general, the IEEE 802.11 beacon frame format includes a Medium Access Control (MAC) header and a frame body. The frame body includes one or more information elements. In one embodiment, the TF scheduling information is included in an information element in the frame body of the IEEE 802.11 beacon. The TF scheduling information signals, for each TF variant, the offset (TF offset) to the next TF (i.e., to the next TTTT) and the interval (TF interval) between subsequent TFs (i.e., between subsequent TTTTs), see FIG. 2.

In one embodiment, the STA 104 receives this information via the beacon and, based on this information, is able to compute the time at which every TF transmission is to occur, e.g., up until the next beacon transmission.

In one embodiment, the TF scheduling information also contains additional information about the upcoming TFs (e.g., information about the content of the upcoming TFs). One option is to include the number of random-access RUs that are available for uplink OFDMA random access. Another option is to include the traffic category polled by or traffic identifiers that will be polled by the TF. A third option is to signal explicitly which STAs will be polled in which interval by the different trigger frames. A fourth option is to signal the RU allocation which will be used in all trigger frames.

In a second embodiment, the signaling is not done using an information element in the beacon. Instead, the TF scheduling information is included in the TF itself. One option is to signal in each TF the TTTT of the next TF. Another option is to signal separately for each STA that is addressed in the current TF the TTTT of the TF that will contain resources for this STA. Furthermore, the TF can signal the TTTT of other TF variants, for example the TTTT of the next BSRP-TF in a basic TF. Note that in IEEE 802.11, the basic TF is a type of TF used to solicit uplink data from one or more STAs. In contrast, as BSRP-TF is a type of TF used to solicit a BSR from one or more STAs.

In third embodiment, the TF scheduling information is signaled to the STA 104 individually. Such individual signaling of TF scheduling information, as opposed to using a broadcast message such as the beacon, may allow for more differentiated Quality of Service (QoS) to specific STAs. For example, STAs having different QoS requirements may be provided different TF scheduling information. Thus, for instance, a STA having strict latency requirements may be provided TF scheduling information that indicates a smaller TF offset and/or smaller TF interval than a STA having less strict latency requirements.

Figure 3:
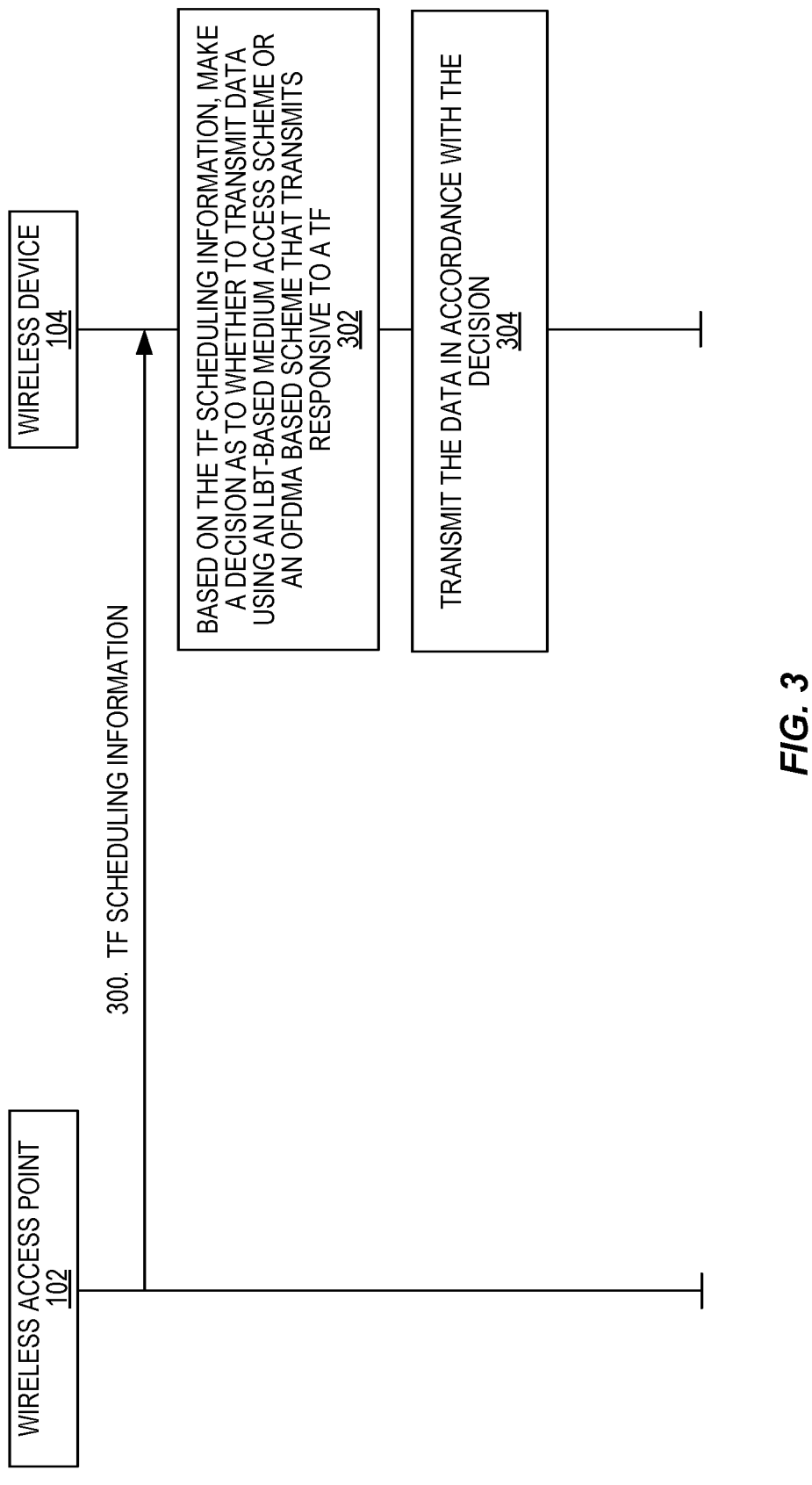
FIG. 3 is a flow chart that illustrates the operation of the wireless access point and the wireless device of FIG. 1 in accordance with at least some of the embodiments described herein.

FIG. 3 is a flow chart that illustrates the operation of the wireless access point 102 and the wireless device 104 in accordance with at least some of the embodiments described above. As illustrated, the wireless access point 102 transmits, and the wireless device 104 receives, TF scheduling information (step 300). As described above, the TF scheduling information indicates a TF schedule or, in other words, indicates when (i.e., time at which) one or more upcoming TFs are to occur. Thus, the TF scheduling information indicates the time(s) at which an upcoming TF(s) is to be transmitted. All of the details regarding the TF scheduling information and how it is signaled to the wireless device 104 (e.g., to a STA) described above are equally applicable here. For example, as discussed above, in one embodiment, the TF scheduling information is comprised in a broadcast message such as a beacon transmitted by the wireless access point 102. In another embodiment, the TF scheduling information is included in a TF. In one embodiment, the TF scheduling information is general information that is transmitted to multiple wireless devices including the wireless device 104 (e.g., as in the case of the TF scheduling information being included in a beacon). In another embodiment, the TF scheduling information is transmitted individually to the wireless device 104. As also described above, in some embodiments, the TF scheduling information includes additional information about the upcoming TF(s).

At the wireless device 104, the wireless device 104 performs one or more actions based on the TF scheduling information. In general, the wireless device 104 uses the TF scheduling information to decide whether to transmit data using an LBT-based medium access scheme or an OFDMA scheme in which data is transmitted responsive to reception of a TF. More specifically, in the illustrated embodiment, the wireless device 104 makes a decision, based on the TF scheduling information, as to whether to transmit data using LBT-based medium access scheme (e.g., EDCAF in IEEE 802.11) or a OFDMA scheme in which data is transmitted responsive to reception of a TF (e.g., the OFDMA scheme defined for uplink traffic in IEEE 802.11 amendment "ax") (step 302). For example, if the TF scheduling information indicates that the next TF occurs at a time that would enable the wireless device 104 to satisfy a latency requirement for the data to be transmitted, the wireless device 104 makes a decision to use the OFDMA scheme in which data is transmitted responsive to reception of a TF. Otherwise, the wireless device 104 decides to transmit the data using the LBT-based medium access scheme.

Note that the decision made in step 302 may also be based on additional information included in or with the TF scheduling information. This additional information is described above. For example, the additional information may include the number of random-access RUs that are available for uplink OFDMA random access. This information may be used to make the decision of step 302 by, for example, making a decision to use the OFDMA-based scheme if the TF scheduling information indicates that the upcoming TF will enable the wireless device 104 to satisfy the latency requirement and the number of random access RUs that are available for uplink OFDMA is greater than a predefined or configured threshold. As another example, the additional information may include the traffic category polled by or traffic identifiers that will be polled by the upcoming TF(s). This information may be used to make the decision of step 302 by, for example, making a decision to use the OFDMA-based scheme if the TF scheduling information indicates that the upcoming TF will enable the wireless device 104 to satisfy the latency requirement and the traffic category or traffic identifier(s) polled by the upcoming TF matches that of the data to be transmitted. As another example, the additional information may include information that explicitly indicates which STAs will be polled in which interval by the upcoming TFs. This information may be used to make the decision of step 302 by, for example, making a decision to use the OFDMA-based scheme if the TF scheduling information indicates that the upcoming TF will enable the wireless device 104 to satisfy the latency requirement and the wireless device 104 is indicated as one of the STAs to be polled by the upcoming TFs. As another example, the additional information may include information that indicates the RU allocation which will be used in the upcoming TF(s). This information may be used to make the decision of step 302 by, for example, making a decision to use the OFDMA-based scheme if the TF scheduling information indicates that the upcoming TF will enable the wireless device 104 to satisfy the latency requirement and the indicated RU allocation is sufficient for transmission of the data.

The wireless device 104 then transmits the data in accordance with the decision (e.g., using either the LBT-based scheme or the OFDMA scheme in accordance with the decision) (step 304).

Figure 4:
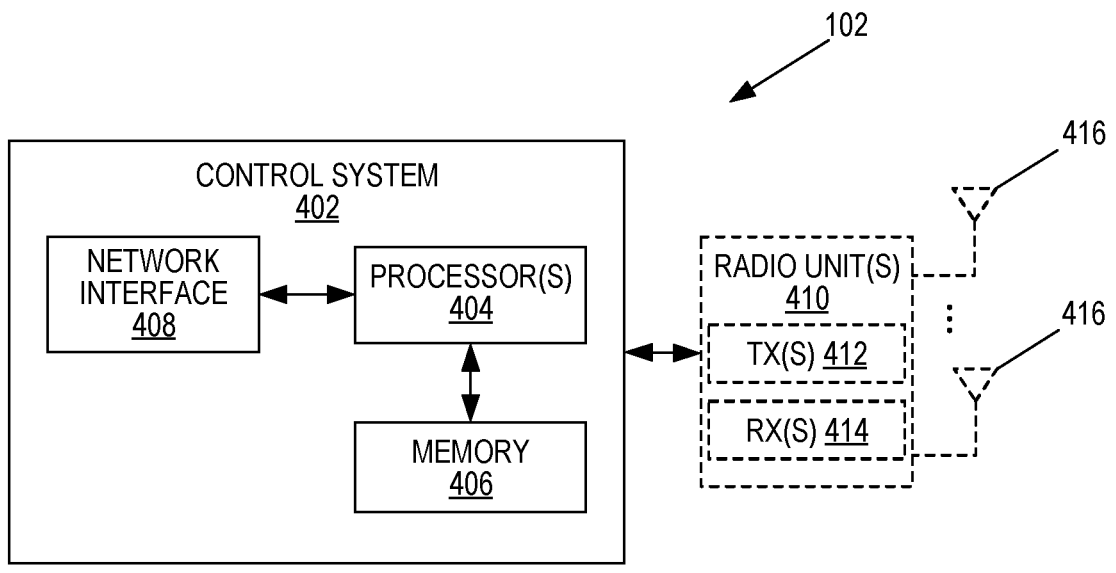
FIG. 4 is a schematic block diagram of a wireless access point according to some embodiments of the present disclosure.

FIG. 4 is a schematic block diagram of the wireless access point 102 according to some embodiments of the present disclosure. Optional features are represented by dashed boxes. As illustrated, the wireless access point 102 includes a control system 402 that includes one or more processors 404 (e.g., Central Processing Units (CPUs), Application Specific Integrated Circuits (ASICs), Field Programmable Gate Arrays (FPGAs), and/or the like), memory 406, and a network interface 408. The one or more processors 404 are also referred to herein as processing circuitry. In addition, the wireless access point 102 includes one or more radio units 410 that each includes one or more transmitters 412 and one or more receivers 414 coupled to one or more antennas 416. The radio units 410 may be referred to or be part of radio interface circuitry. In some embodiments, the radio unit(s) 410 is external to the control system 402 and connected to the control system 402 via, e.g., a wired connection (e.g., an optical cable). However, in some other embodiments, the radio unit(s) 410 and potentially the antenna(s) 416 are integrated together with the control system 402. The one or more processors 404 operate to provide one or more functions of the wireless access point 102 (or AP) as described herein. In some embodiments, the function(s) are implemented in software that is stored, e.g., in the memory 406 and executed by the one or more processors 404.

In some embodiments, a computer program including instructions which, when executed by at least one processor, causes the at least one processor to carry out the functionality of the wireless access point 102 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 5:
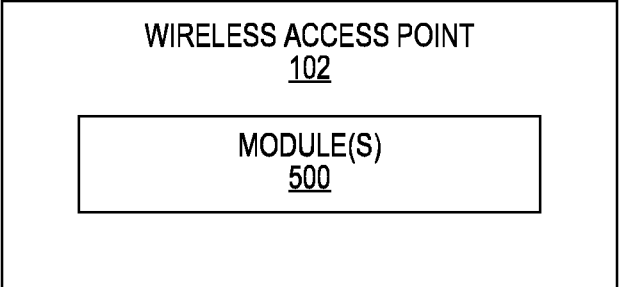
FIG. 5 is a schematic block diagram of the wireless access point of FIG. 4 according to some other embodiments of the present disclosure.

FIG. 5 is a schematic block diagram of the wireless access point 102 according to some other embodiments of the present disclosure. The wireless access point 102 includes one or more modules 500, each of which is implemented in software. The module(s) 500 provide the functionality of the wireless access point 102 described herein.

Figure 6:
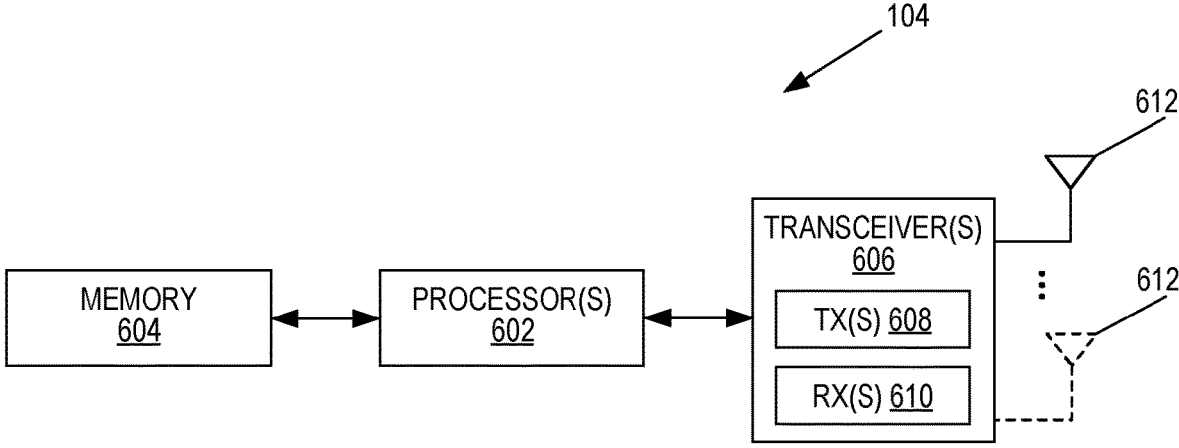
FIG. 6 is a schematic block diagram of a wireless device according to some embodiments of the present disclosure.

FIG. 6 is a schematic block diagram of a wireless device 104 according to some embodiments of the present disclosure. As illustrated, the wireless device 104 includes one or more processors 602 (e.g., CPUs, ASICs, FPGAs, and/or the like), memory 604, and one or more transceivers 606 each including one or more transmitters 608 and one or more receivers 610 coupled to one or more antennas 612. The transceiver(s) 606 includes radio-front end circuitry connected to the antenna(s) 612 that is configured to condition signals communicated between the antenna(s) 612 and the processor(s) 602, as will be appreciated by on of ordinary skill in the art. The processors 602 are also referred to herein as processing circuitry. The transceivers 606 are also referred to herein as radio circuitry. In some embodiments, the functionality of the wireless device 104 (or STA) described above may be fully or partially implemented in software that is, e.g., stored in the memory 604 and executed by the processor(s) 602. Note that the wireless device 104 may include additional components not illustrated in FIG. 6 such as, e.g., one or more user interface components (e.g., an input/output interface including a display, buttons, a touch screen, a microphone, a speaker(s), and/or the like and/or any other components for allowing input of information into the wireless device 104 and/or allowing output of information from the wireless device 104), a power supply (e.g., a battery and associated power circuitry), etc.

In some embodiments, a computer program including instructions which, when executed by at least one processor, causes the at least one processor to carry out the functionality of the wireless device 104 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 7:
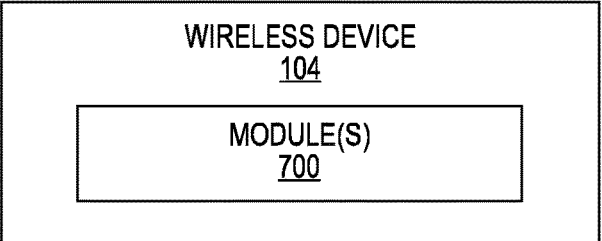
FIG. 7 is a schematic block diagram of the wireless device of FIG. 6 according to some other embodiments of the present disclosure.

FIG. 7 is a schematic block diagram of the wireless device 104 according to some other embodiments of the present disclosure. The wireless device 104 includes one or more modules 700, each of which is implemented in software. The module(s) 700 provide the functionality of the wireless device 104 described herein.

While the embodiments described above are primarily described with respect to IEEE 802.11, they are not limited thereto. Rather, the embodiments described above can be implemented in other types of wireless communications networks such as, for example, a cellular communications network (e.g., a 3GPP network) such as a cellular communications network that operates in unlicensed spectrum (e.g., New Radio in Unlicensed spectrum (NR-U)). In this regard, the base station in the cellular communications network (e.g., gNB) corresponds to the wireless access point 104, and the UE in the cellular communications network corresponds to the wireless device 104. In this regard, FIGS. 8 through 12 below illustrate an example of a communications system that includes a cellular communications network in which the embodiments described above may be implemented. The discussion below further describes embodiments in which the cellular communications network interacts with a host system to deliver data for an OTT service; however, the use of embodiments of the present disclosure for delivery of data for an OTT service is only an example.

Figure 8:
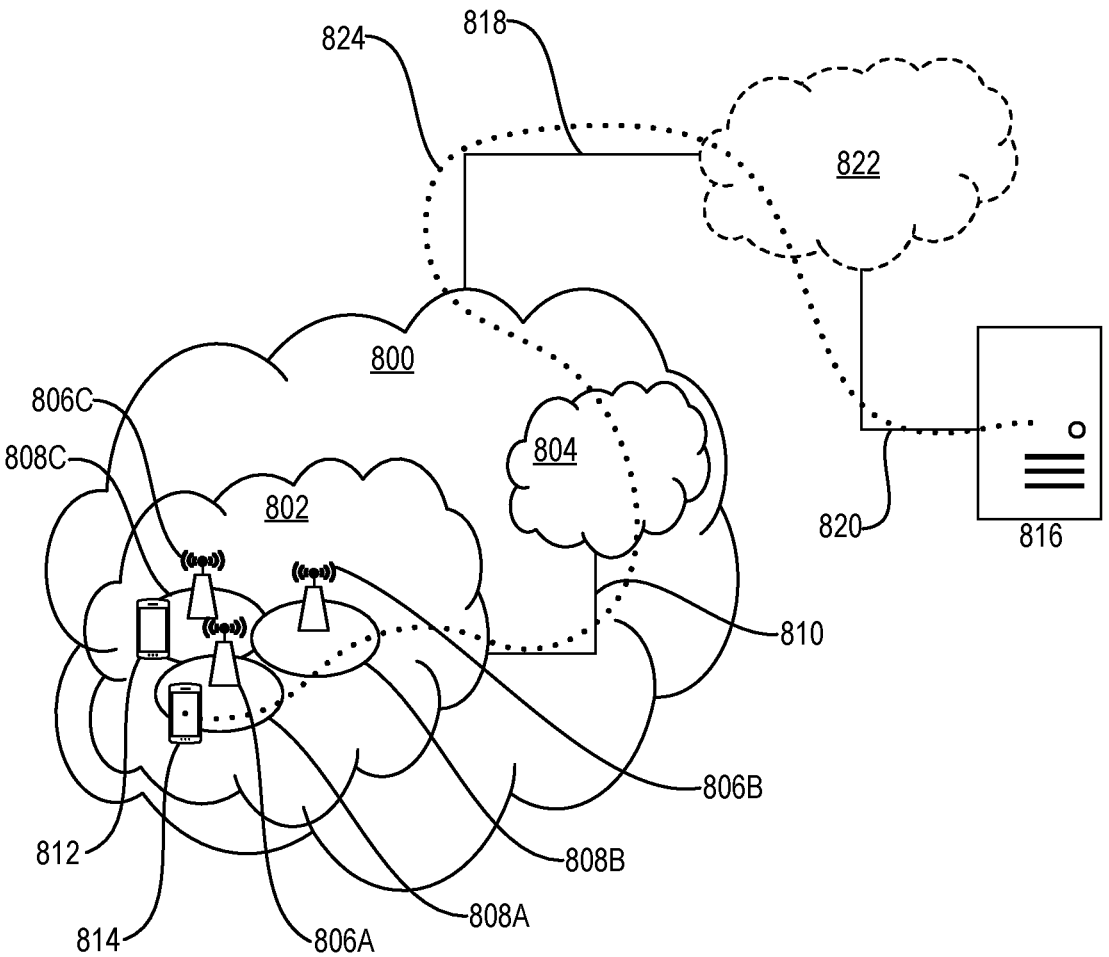
FIG. 8 illustrates a telecommunication network connected via an intermediate network to a host computer in accordance with some embodiments of the present disclosure.

With reference to FIG. 8, in accordance with an embodiment, a communication system includes a telecommunication network 800, such as a 3GPP-type cellular network, which comprises an access network 802, such as a RAN, and a core network 804. The access network 802 comprises a plurality of base stations 806A, 806B, 806C, such as Node Bs, eNBs, gNBs, or other types of wireless Access Points (APs), each defining a corresponding coverage area 808A, 808B, 808C. Each base station 806A, 806B, 806C is connectable to the core network 804 over a wired or wireless connection 810. A first UE 812 located in coverage area 808C is configured to wirelessly connect to, or be paged by, the corresponding base station 806C. A second UE 814 in coverage area 808A is wirelessly connectable to the corresponding base station 806A. While a plurality of UEs 812, 814 are illustrated in this example, the disclosed embodiments are equally applicable to a situation where a sole UE is in the coverage area or where a sole UE is connecting to the corresponding base station 806.

The telecommunication network 800 is itself connected to a host computer 816, which may be embodied in the hardware and/or software of a standalone server, a cloud-implemented server, a distributed server, or as processing resources in a server farm. The host computer 816 may be under the ownership or control of a service provider, or may be operated by the service provider or on behalf of the service provider. Connections 818 and 820 between the telecommunication network 800 and the host computer 816 may extend directly from the core network 804 to the host computer 816 or may go via an optional intermediate network 822. The intermediate network 822 may be one of, or a combination of more than one of, a public, private, or hosted network; the intermediate network 822, if any, may be a backbone network or the Internet; in particular, the intermediate network 822 may comprise two or more sub-networks (not shown).

The communication system of FIG. 8 as a whole enables connectivity between the connected UEs 812, 814 and the host computer 816. The connectivity may be described as an Over-the-Top (OTT) connection 824. The host computer 816 and the connected UEs 812, 814 are configured to communicate data and/or signaling via the OTT connection 824, using the access network 802, the core network 804, any intermediate network 822, and possible further infrastructure (not shown) as intermediaries. The OTT connection 824 may be transparent in the sense that the participating communication devices through which the OTT connection 824 passes are unaware of routing of uplink and downlink communications. For example, the base station 806 may not or need not be informed about the past routing of an incoming downlink communication with data originating from the host computer 816 to be forwarded (e.g., handed over) to a connected UE 812. Similarly, the base station 806 need not be aware of the future routing of an outgoing uplink communication originating from the UE 812 towards the host computer 816.

Example implementations, in accordance with an embodiment, of the UE, base station, and host computer discussed in the preceding paragraphs will now be described with reference to FIG. 9. In a communication system 900, a host computer 902 comprises hardware 904 including a communication interface 906 configured to set up and maintain a wired or wireless connection with an interface of a different communication device of the communication system 900. The host computer 902 further comprises processing circuitry 908, which may have storage and/or processing capabilities. In particular, the processing circuitry 908 may comprise one or more programmable processors, ASICs, FPGAs, or combinations of these (not shown) adapted to execute instructions. The host computer 902 further comprises software 910, which is stored in or accessible by the host computer 902 and executable by the processing circuitry 908. The software 910 includes a host application 912. The host application 912 may be operable to provide a service to a remote user, such as a UE 914 connecting via an OTT connection 916 terminating at the UE 914 and the host computer 902. In providing the service to the remote user, the host application 912 may provide user data which is transmitted using the OTT connection 916.

The communication system 900 further includes a base station 918 provided in a telecommunication system and comprising hardware 920 enabling it to communicate with the host computer 902 and with the UE 914. The hardware 920 may include a communication interface 922 for setting up and maintaining a wired or wireless connection with an interface of a different communication device of the communication system 900, as well as a radio interface 924 for setting up and maintaining at least a wireless connection 926 with the UE 914 located in a coverage area (not shown in FIG. 9) served by the base station 918. The communication interface 922 may be configured to facilitate a connection 928 to the host computer 902. The connection 928 may be direct or it may pass through a core network (not shown in FIG. 9) of the telecommunication system and/or through one or more intermediate networks outside the telecommunication system. In the embodiment shown, the hardware 920 of the base station 918 further includes processing circuitry 930, which may comprise one or more programmable processors, ASICs, FPGAs, or combinations of these (not shown) adapted to execute instructions. The base station 918 further has software 932 stored internally or accessible via an external connection.

The communication system 900 further includes the UE 914 already referred to. The UE's 914 hardware 934 may include a radio interface 936 configured to set up and maintain a wireless connection 926 with a base station serving a coverage area in which the UE 914 is currently located. The hardware 934 of the UE 914 further includes processing circuitry 938, which may comprise one or more programmable processors, ASICs, FPGAs, or combinations of these (not shown) adapted to execute instructions. The UE 914 further comprises software 940, which is stored in or accessible by the UE 914 and executable by the processing circuitry 938. The software 940 includes a client application 942. The client application 942 may be operable to provide a service to a human or non-human user via the UE 914, with the support of the host computer 902. In the host computer 902, the executing host application 912 may communicate with the executing client application 942 via the OTT connection 916 terminating at the UE 914 and the host computer 902. In providing the service to the user, the client application 942 may receive request data from the host application 912 and provide user data in response to the request data. The OTT connection 916 may transfer both the request data and the user data. The client application 942 may interact with the user to generate the user data that it provides.

Figure 9:
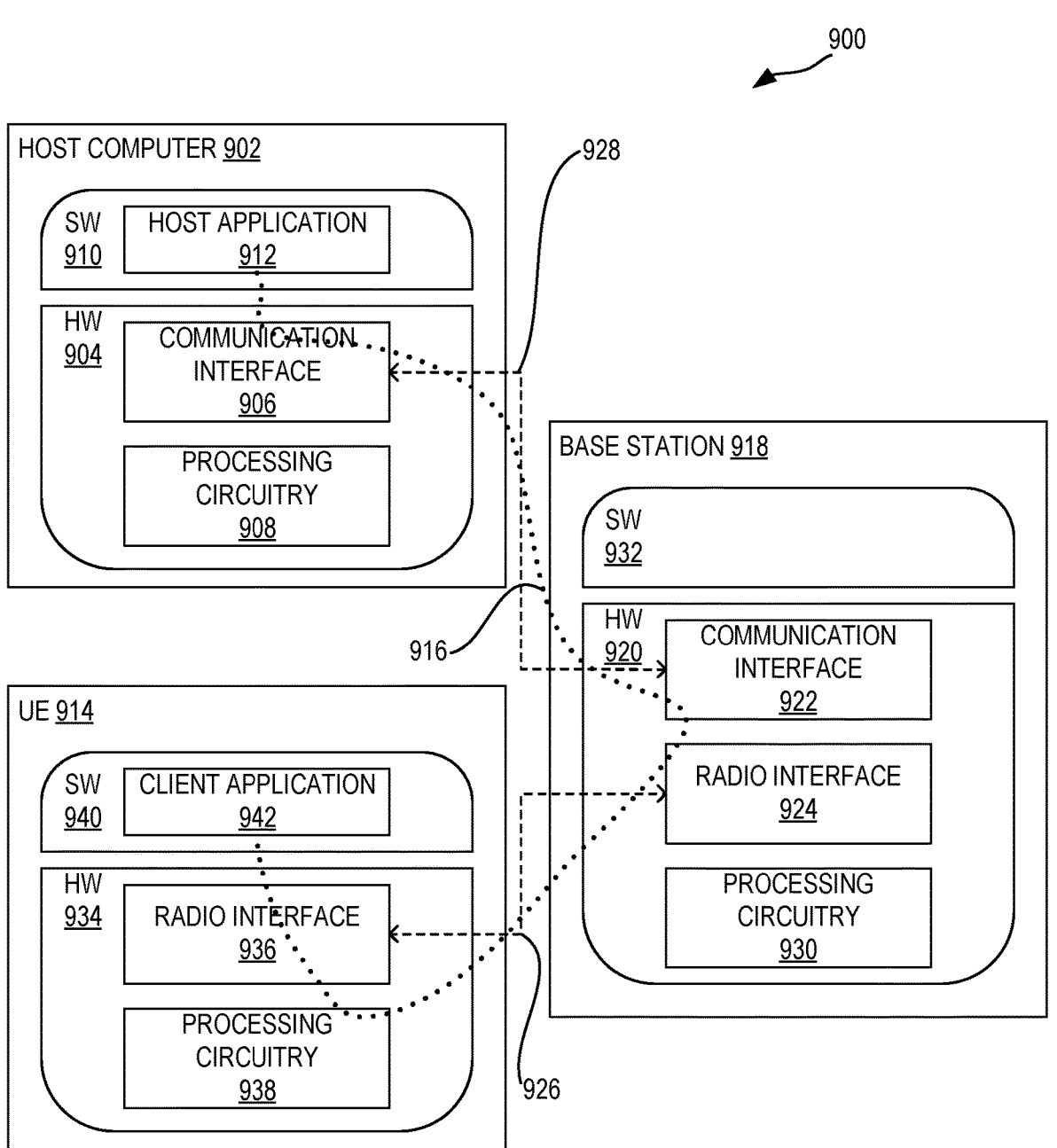
FIG. 9 is a generalized block diagram of a host computer communicating via a base station with a UE over a partially wireless connection in accordance with some embodiments of the present disclosure.

It is noted that the host computer 902, the base station 918, and the UE 914 illustrated in FIG. 9 may be similar or identical to the host computer 816, one of the base stations 806A, 806B, 806C, and one of the UEs 812, 814 of FIG. 8, respectively. This is to say, the inner workings of these entities may be as shown in FIG. 9 and independently, the surrounding network topology may be that of FIG. 8.

In FIG. 9, the OTT connection 916 has been drawn abstractly to illustrate the communication between the host computer 902 and the UE 914 via the base station 918 without explicit reference to any intermediary devices and the precise routing of messages via these devices. The network infrastructure may determine the routing, which may be configured to hide from the UE 914 or from the service provider operating the host computer 902, or both. While the OTT connection 916 is active, the network infrastructure may further take decisions by which it dynamically changes the routing (e.g., on the basis of load balancing consideration or reconfiguration of the network).

The wireless connection 926 between the UE 914 and the base station 918 is in accordance with the teachings of the embodiments described throughout this disclosure. One or more of the various embodiments improve the performance of OTT services provided to the UE 914 using the OTT connection 916, in which the wireless connection 926 forms the last segment. More precisely, the teachings of these embodiments may improve, e.g., latency and thereby provide benefits such as, e.g., better responsiveness.

A measurement procedure may be provided for the purpose of monitoring data rate, latency, and other factors on which the one or more embodiments improve. There may further be an optional network functionality for reconfiguring the OTT connection 916 between the host computer 902 and the UE 914, in response to variations in the measurement results. The measurement procedure and/or the network functionality for reconfiguring the OTT connection 916 may be implemented in the software 910 and the hardware 904 of the host computer 902 or in the software 940 and the hardware 934 of the UE 914, or both. In some embodiments, sensors (not shown) may be deployed in or in association with communication devices through which the OTT connection 916 passes; the sensors may participate in the measurement procedure by supplying values of the monitored quantities exemplified above, or supplying values of other physical quantities from which the software 910, 940 may compute or estimate the monitored quantities. The reconfiguring of the OTT connection 916 may include message format, retransmission settings, preferred routing, etc.; the reconfiguring need not affect the base station 918, and it may be unknown or imperceptible to the base station 918. Such procedures and functionalities may be known and practiced in the art. In certain embodiments, measurements may involve proprietary UE signaling facilitating the host computer 902's measurements of throughput, propagation times, latency, and the like. The measurements may be implemented in that the software 910 and 940 causes messages to be transmitted, in particular empty or 'dummy' messages, using the OTT connection 916 while it monitors propagation times, errors, etc.

Figures 10, 11:
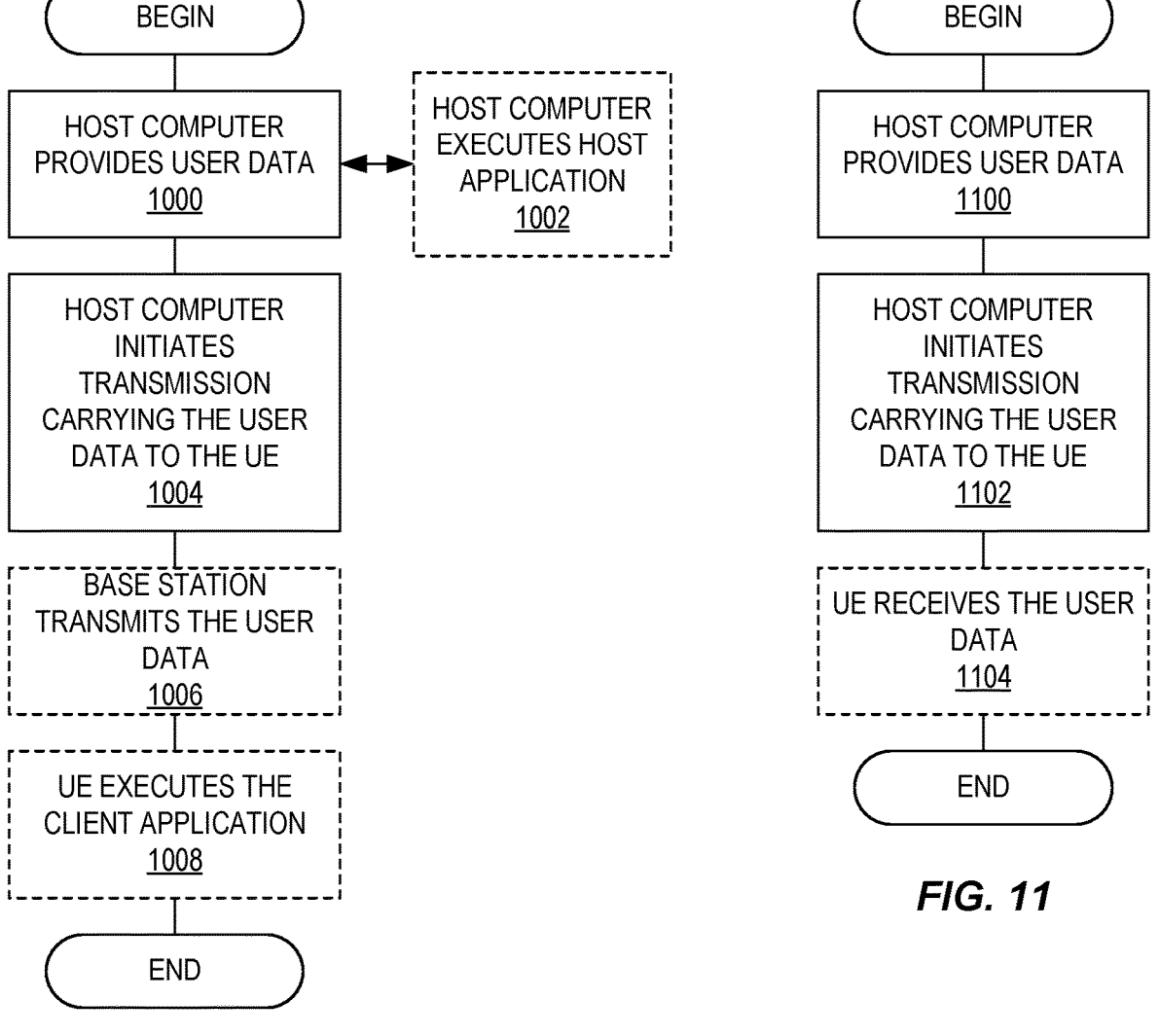
FIG. 10 is a flowchart illustrating a method implemented in a communication system in accordance with one embodiment of the present disclosure.
FIG. 11 is a flowchart illustrating a method implemented in a communication system in accordance with one embodiment of the present disclosure.

FIG. 10 is a flowchart illustrating a method implemented in a communication system, in accordance with one embodiment. The communication system includes a host computer, a base station, and a UE which may be those described with reference to FIGS. 8 and 9. For simplicity of the present disclosure, only drawing references to FIG. 10 will be included in this section. In step 1000, the host computer provides user data. In sub-step 1002 (which may be optional) of step 1000, the host computer provides the user data by executing a host application. In step 1004, the host computer initiates a transmission carrying the user data to the UE. In step 1006 (which may be optional), the base station transmits to the UE the user data which was carried in the transmission that the host computer initiated, in accordance with the teachings of the embodiments described throughout this disclosure. In step 1008 (which may also be optional), the UE executes a client application associated with the host application executed by the host computer.

FIG. 11 is a flowchart illustrating a method implemented in a communication system, in accordance with one embodiment. The communication system includes a host computer, a base station, and a UE which may be those described with reference to FIGS. 8 and 9. For simplicity of the present disclosure, only drawing references to FIG. 11 will be included in this section. In step 1100 of the method, the host computer provides user data. In an optional sub-step (not shown) the host computer provides the user data by executing a host application. In step 1102, the host computer initiates a transmission carrying the user data to the UE. The transmission may pass via the base station, in accordance with the teachings of the embodiments described throughout this disclosure. In step 1104 (which may be optional), the UE receives the user data carried in the transmission.

Figures 12, 13:
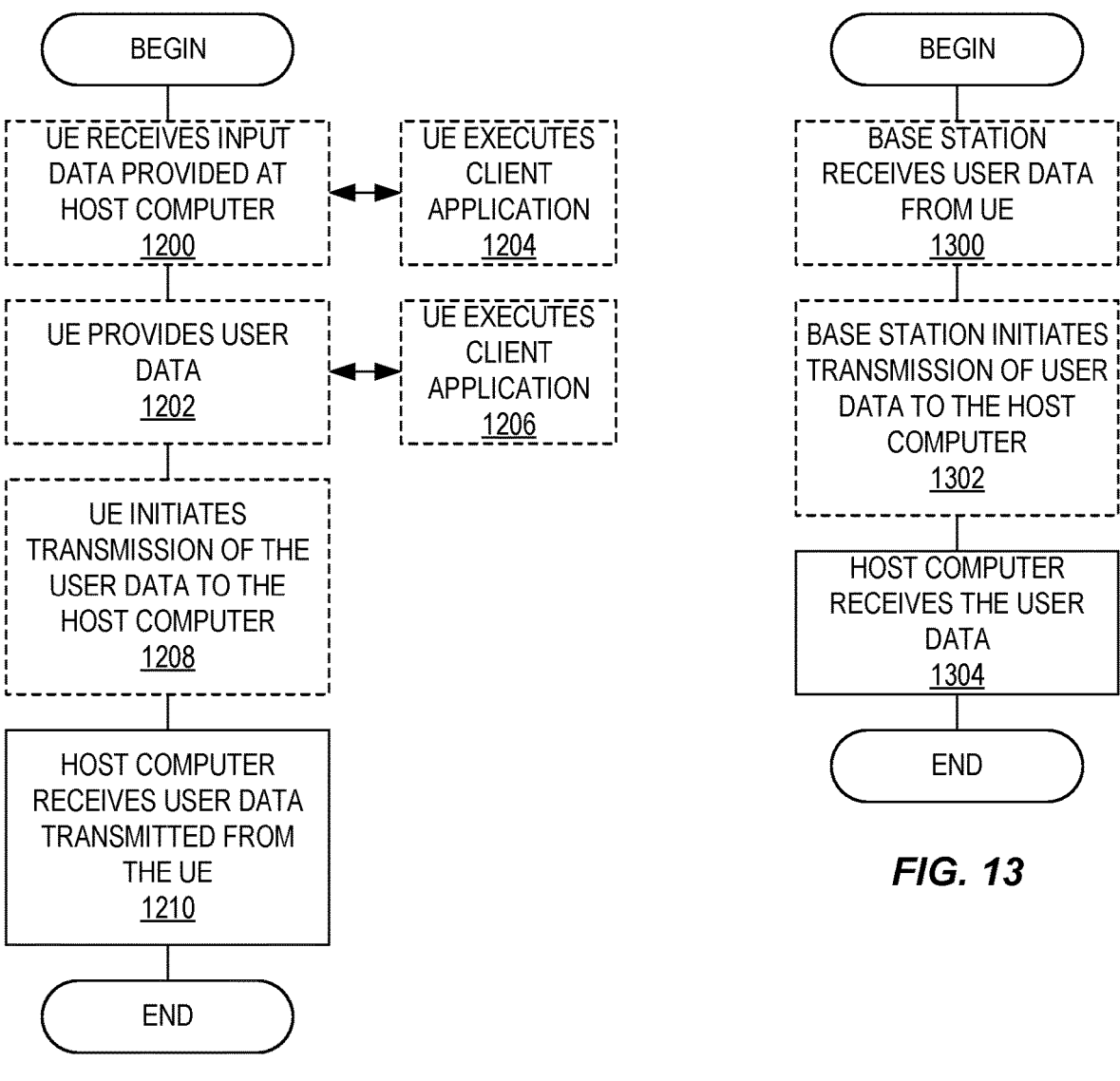
FIG. 12 is a flowchart illustrating a method implemented in a communication system in accordance with one embodiment of the present disclosure.
FIG. 13 is a flowchart illustrating a method implemented in a communication system in accordance with one embodiment of the present disclosure.

FIG. 12 is a flowchart illustrating a method implemented in a communication system, in accordance with one embodiment. The communication system includes a host computer, a base station, and a UE which may be those described with reference to FIGS. 8 and 9. For simplicity of the present disclosure, only drawing references to FIG. 12 will be included in this section. In step 1200 (which may be optional), the UE receives input data provided by the host computer. Additionally or alternatively, in step 1202, the UE provides user data. In sub-step 1204 (which may be optional) of step 1200, the UE provides the user data by executing a client application. In sub-step 1206 (which may be optional) of step 1202, the UE executes a client application which provides the user data in reaction to the received input data provided by the host computer. In providing the user data, the executed client application may further consider user input received from the user. Regardless of the specific manner in which the user data was provided, the UE initiates, in sub-step 1208 (which may be optional), transmission of the user data to the host computer. In step 1210 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station, and a UE which may be those described with reference to FIGS. 8 and 9. For simplicity of the present disclosure, only drawing references to FIG. 13 will be included in this section. In step 1300 (which may be optional), in accordance with the teachings of the embodiments described throughout this disclosure, the base station receives user data from the UE. In step 1302 (which may be optional), the base station initiates transmission of the received user data to the host computer. In step 1304 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

GROUP A EMBODIMENTS

Embodiment 1: A method performed by a wireless device (104) for a wireless network (100), the method comprising:

receiving (300), from a wireless access point (102), trigger frame, TF, scheduling information that indicates transmission times of one or more upcoming TFs; and performing one or more actions based on the TF scheduling information.

Embodiment 2: The method of embodiment 1 wherein the wireless device (104) is an IEEE 802.11 STA, and the wireless access point (102) in an IEEE 802.11 AP.

Embodiment 3: The method of embodiment 1 or 2 wherein performing the one or more actions based on the TF scheduling information comprises: making (302) a decision, based on the TF scheduling information, as to whether to transmit data using (a) a Listen Before Talk, LBT, based medium access scheme or (b) an Orthogonal Frequency Division Multiple Access, OFDMA, based scheme in which data in transmitted responsive to reception of a TF; and transmitting (304) the data in accordance with the decision.

Embodiment 4: The method of embodiment 3 herein the LBT-based medium access scheme is enhanced distributed channel access function, EDCAF, and the OFDMA-based scheme is UL-OFDMA.

Embodiment 5: The method of any of embodiments 1 to 4 wherein the TF scheduling information comprises a time offset between a time at which the TF scheduling information is received and a transmission time of a next upcoming TF.

Embodiment 6: The method of any of embodiments 1 to 5 wherein the TF scheduling information comprises a time offset between upcoming TFs.

Embodiment 7: The method of any of embodiments 1 to 6 wherein the TF scheduling information comprises additional information about the one or more upcoming TFs.

Embodiment 8: The method of embodiment 7 wherein the additional information comprises information that indicates a number of random access RUs of at least one of the one or more upcoming TFs.

Embodiment 9: The method of embodiment 7 or 8 wherein the additional information comprises information that indicates a traffic category or allocation of at least one of the one or more upcoming TFs.

Embodiment 10: The method of any of embodiments 7 to 9 wherein the additional information comprises information that indicates (e.g., explicitly) one or more wireless devices that will be polled by at least one of the one or more upcoming TFs.

Embodiment 11: The method of any of embodiments 1 to 10 wherein receiving (300) the TF scheduling information comprises receiving a broadcast message (e.g., a beacon) from the wireless access point (102), the broadcast message comprising the TF scheduling information.

Embodiment 12: The method of any of embodiments 1 to 10 wherein receiving (300) the TF scheduling information comprises receiving a TF from the wireless access point (102), the TF comprising the TF scheduling information.

Embodiment 13: The method of any of embodiments 1 to 10 wherein receiving (300) the TF scheduling information comprises receiving signaling that is individually transmitted to the wireless device (104) from the wireless access point (102), the signaling comprising the TF scheduling information.

Embodiment 14: The method of embodiment 13 wherein the TF scheduling information comprises information about one or more upcoming TFs that are intended only for the wireless device (104).

GROUP B EMBODIMENTS

Embodiment 15: A method performed by a wireless access point (102) for a wireless network (100), the method comprising transmitting (300), to one or more wireless devices (104), trigger frame, TF, scheduling information that indicates transmission times of one or more upcoming TFs.

Embodiment 16: The method of embodiment 15 wherein the wireless device (104) is an IEEE 802.11 STA, and the wireless access point (102) in an IEEE 802.11 AP.

Embodiment 17: The method of embodiment 16 herein the LBT-based transmission scheme is EDCAF, and the OFDMA-based scheme is UL-OFDMA.

Embodiment 18: The method of any of embodiments 15 to 17 wherein the TF scheduling information comprises a time offset between a time at which the TF scheduling information is received and a transmission time of a next upcoming TF.

Embodiment 19: The method of any of embodiments 15 to 18 wherein the TF scheduling information comprises a time offset between upcoming TFs.

Embodiment 20: The method of any of embodiments 15 to 19 wherein the TF scheduling information comprises additional information about the one or more upcoming TFs.

Embodiment 21: The method of embodiment 20 wherein the additional information comprises information that indicates a number of random access RUs of at least one of the one or more upcoming TFs.

Embodiment 22: The method of embodiment 20 or 21 wherein the additional information comprises information that indicates a traffic category or allocation of at least one of the one or more upcoming TFs.

Embodiment 23: The method of any of embodiments 20 to 22 wherein the additional information comprises information that indicates (e.g., explicitly) one or more wireless devices that will be polled by at least one of the one or more upcoming TFs.

Embodiment 24: The method of any of embodiments 15 to 23 wherein transmitting (300) the TF scheduling information comprises transmitting a broadcast message (e.g., a beacon), the broadcast message the TF scheduling information.

Embodiment 25: The method of any of embodiments 15 to 23 wherein transmitting (300) the TF scheduling information comprises transmitting a TF, the TF comprising the TF scheduling information.

Embodiment 26: The method of any of embodiments 15 to 23 wherein transmitting (300) the TF scheduling information comprises transmitting signaling that is individually transmitted to the wireless device (104), the signaling comprising the TF scheduling information.

Embodiment 27: The method of embodiment 26 wherein the TF scheduling information comprises information about one or more upcoming TFs that are intended only for the wireless device (104).

GROUP C EMBODIMENTS

Embodiment 28: A wireless device (104) for a wireless network (100), the wireless device (104) adapted to: receive (300), from a wireless access point (102), trigger frame, TF, scheduling information that indicates transmission times of one or more upcoming TFs; and perform one or more actions based on the TF scheduling information.

Embodiment 29: The wireless device (104) of embodiment 28 wherein the wireless device (104) is further adapted to perform the method of any of embodiments 2 to 14.

Embodiment 30: A wireless device (104) for a wireless network (100), the wireless device (104) comprising: one or more transmitters (608); one or more receivers (610); and processing circuitry (602) associated with the one or more transmitters (608) and the one or more receiver (610), the processing circuitry (602) configured to cause the wireless device (104) to: receive (300), from a wireless access point (102), trigger frame, TF, scheduling information that indicates transmission times of one or more upcoming TFs; and perform one or more actions based on the TF scheduling information.

Embodiment 31: The wireless device (104) of embodiment 30 wherein the processing circuitry (602) is further configured to cause the wireless device (104) to perform the method of any of embodiments 2 to 14.

Embodiment 32: A computer program comprising instructions which, when executed on at least one processor, cause the at least one processor to carry out the method according to any of embodiments 1 to 14.

Embodiment 33: A carrier containing the computer program of embodiment 32, wherein the carrier is one of an electronic signal, an optical signal, a radio signal, or a computer readable storage medium.

Embodiment 34: A non-transitory computer readable medium storing instructions executable by processing circuitry of a wireless device whereby the wireless device is operable to: receive (300), from a wireless access point (102), trigger frame, TF, scheduling information that indicates transmission times of one or more upcoming TFs; and perform one or more actions based on the TF scheduling information.

Embodiment 35: A wireless access point (102) for a wireless network (100), the wireless access point (102) adapted to: transmit (300), to one or more wireless devices (104), trigger frame, TF, scheduling information that indicates transmission times of one or more upcoming TFs.

Embodiment 36: The wireless access point (102) of embodiment 35 wherein the wireless access point (102) is further adapted to perform the method of any of embodiments 16 to 27.

Embodiment 37: A wireless access point (102) for a wireless network (100), the wireless device (104) comprising: transmit (300), to one or more wireless devices (104), trigger frame, TF, scheduling information that indicates transmission times of one or more upcoming TFs.

Embodiment 38: The wireless device (104) of embodiment 37 wherein the processing circuitry (602) is further configured to cause the wireless device (104) to perform the method of any of embodiments 16 to 27.

Embodiment 39: A computer program comprising instructions which, when executed on at least one processor, cause the at least one processor to carry out the method according to any of embodiments 15 to 27.

Embodiment 40: A carrier containing the computer program of embodiment 39, wherein the carrier is one of an electronic signal, an optical signal, a radio signal, or a computer readable storage medium.

Embodiment 41: A non-transitory computer readable medium storing instructions executable by processing circuitry of a wireless access point whereby the wireless access point is operable to: transmit (300), to one or more wireless devices (104), trigger frame, TF, scheduling information that indicates transmission times of one or more upcoming TFs.

Embodiment 42: A wireless device comprising: processing circuitry configured to perform any of the steps of any of the Group A embodiments; and power supply circuitry configured to supply power to the wireless device.

Embodiment 43: A base station comprising: processing circuitry configured to perform any of the steps of any of the Group B embodiments; and power supply circuitry configured to supply power to the base station.

Embodiment 44: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 45: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 46: The communication system of the previous embodiment further including the base station.

Embodiment 47: The communication system of the previous 2 embodiments, further including the UE, wherein the UE is configured to communicate with the base station.

Embodiment 48: The communication system of the previous 3 embodiments, wherein: the processing circuitry of the host computer is configured to execute a host application, thereby providing the user data; and the UE comprises processing circuitry configured to execute a client application associated with the host application.

Embodiment 49: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 50: The method of the previous embodiment, further comprising, at the base station, transmitting the user data.

Embodiment 51: The method of the previous 2 embodiments, wherein the user data is provided at the host computer by executing a host application, the method further comprising, at the UE, executing a client application associated with the host application.

Embodiment 52: A User Equipment, UE, configured to communicate with a base station, the UE comprising a radio interface and processing circuitry configured to perform the method of the previous 3 embodiments.

Embodiment 53: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 54: The communication system of the previous embodiment, wherein the cellular network further includes a base station configured to communicate with the UE.

Embodiment 55: The communication system of the previous 2 embodiments, wherein: the processing circuitry of the host computer is configured to execute a host application, thereby providing the user data; and the UE's processing circuitry is configured to execute a client application associated with the host application.

Embodiment 56: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 57: The method of the previous embodiment, further comprising at the UE, receiving the user data from the base station.

Embodiment 58: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 59: The communication system of the previous embodiment, further including the UE.

Embodiment 60: The communication system of the previous 2 embodiments, further including the base station, wherein the base station comprises a radio interface configured to communicate with the UE and a communication interface configured to forward to the host computer the user data carried by a transmission from the UE to the base station.

Embodiment 61: The communication system of the previous 3 embodiments, wherein: the processing circuitry of the host computer is configured to execute a host application; and the UE's processing circuitry is configured to execute a client application associated with the host application, thereby providing the user data.

Embodiment 62: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 63: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 64: The method of the previous embodiment, further comprising, at the UE, providing the user data to the base station.

Embodiment 65: The method of the previous 2 embodiments, further comprising: at the UE, executing a client application, thereby providing the user data to be transmitted; and at the host computer, executing a host application associated with the client application.

Embodiment 66: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 67: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 68: The communication system of the previous embodiment further including the base station.

Embodiment 69: The communication system of the previous 2 embodiments, further including the UE, wherein the UE is configured to communicate with the base station.

Embodiment 70: The communication system of the previous 3 embodiments, wherein: the processing circuitry of the host computer is configured to execute a host application; and the UE is configured to execute a client application associated with the host application, thereby providing the user data to be received by the host computer.

Embodiment 71: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 72: The method of the previous embodiment, further comprising at the base station, receiving the user data from the UE.

Embodiment 73: The method of the previous 2 embodiments, further comprising at the base station, initiating a transmission of the received user data to the host computer.

The invention claimed is:

1. A method performed by a wireless device for a wireless network, the method comprising:

receiving, from a wireless access point, information that indicates transmission times of one or more upcoming trigger frames, TFs; and performing one or more actions based on the information that indicates the transmission times of the one or more upcoming TFs;

wherein the information that indicates the transmission times of the one or more upcoming TFs further indicates whether a TF among the at least one of the one or more upcoming TFs will enable the wireless device to satisfy the latency requirement and comprises additional information about the one or more upcoming TFs, the additional information comprises information that indicates whether a traffic category polled by the TF matches that of data to be transmitted, and performing the one or more actions comprises:

receiving the TF indicating whether the one or more upcoming TFs will enable the wireless device to satisfy the latency requirement and the data to be transmitted matches the traffic category;

transmitting the data responsive to reception of the TF.

2. The method of claim 1 wherein the wireless device is an IEEE 802.11 non-access point station, and the wireless access point in an IEEE 802.11 access point station.

3. The method of claim 1 wherein performing the one or more actions based on the information that indicates the transmission times of the one or more upcoming TFs comprises:

making a decision, based on the information that indicates the transmission times of the one or more upcoming TFs, as to whether to transmit data using (a) a Listen Before Talk, LBT, based medium access scheme or (b) trigger frame-based medium access scheme in which data is transmitted responsive to reception of a TF; and transmitting the data in accordance with the decision.

4. The method of claim 3 wherein the LBT-based medium access scheme is an enhanced distributed channel access function, EDCAF, scheme and the trigger frame-based medium access scheme is an Uplink Orthogonal Frequency Multiple Access, UL-OFDMA, based scheme.

5. The method of claim 1 wherein the information that indicates the transmission times of the one or more upcoming TFs comprises a time offset between a time at which the information is received and a transmission time of a next upcoming TF that occurs first in time after the time at which the information is received.

6. The method of claim 1 wherein the information that indicates the transmission times of the one or more upcoming TFs comprises a time interval between subsequent TFs.

7. The method of claim 1 wherein the additional information comprises information that indicates a number of random access resource units, RUs, of at least one of the one or more upcoming TFs.

8. The method of claim 1 wherein the additional information comprises information that indicates one or more wireless devices that will be polled by at least one of the one or more upcoming TFs.

9. The method of claim 1 wherein receiving the information that indicates the transmission times of the one or more upcoming TFs comprises receiving a broadcast message from the wireless access point, the broadcast message comprising the information that indicates the transmission times of the one or more upcoming TFs.

10. The method of claim 1 wherein receiving the information comprises receiving a TF from the wireless access point, the TF comprising the information that indicates the transmission times of the one or more upcoming TFs.

11. A method performed by a wireless access point for a wireless network, the method comprising:
   transmitting, to one or more wireless devices, information that indicates transmission times of one or more upcoming trigger frames, TFs;
   wherein the information that indicates the transmission times of the one or more upcoming TFs further indicates whether a TF among the at least one of the one or more upcoming TFs will enable the one or more wireless devices to satisfy the latency requirement and comprises additional information about the one or more upcoming TFs, and the additional information comprises information that indicates whether a traffic category polled the TF matches that of data to be transmitted the one or more wireless devices.

12. The method of claim 11 wherein the wireless device is an IEEE 802.11 non-access point station, and the wireless access point in an IEEE 802.11 access point station.

13. The method of claim 11 wherein the information that indicates the transmission times of the one or more upcoming TFs comprises a time offset between a time at which the information is received and a transmission time of a next upcoming TF that occurs first in time after the time at which the information is received.

14. The method of claim 11 wherein the information that indicates the transmission times of the one or more upcoming TFs comprises a time interval between subsequent TFs.

15. The method of claim 11 wherein the additional information comprises information that indicates a number of random access resource units, RUs, of at least one of the one or more upcoming TFs.

16. The method of claim 11 wherein the additional information comprises information that indicates one or more wireless devices that will be polled by at least one of the one or more upcoming TFs.

17. The method of claim 11 wherein transmitting the information that indicates the transmission times of the one or more upcoming TFs comprises transmitting a broadcast message, the broadcast message comprising the information that indicates the transmission times of the one or more upcoming TFs.

18. The method of claim 11 wherein transmitting the information that indicates the transmission times of the one or more upcoming TFs comprises transmitting a TF, the TF comprising the information that indicates the transmission times of the one or more upcoming TFs.

19. A wireless device for a wireless network, the wireless device comprising:
   one or more transmitters;
   one or more receivers; and
   processing circuitry associated with the one or more transmitters and the one or more receiver, the processing circuitry configured to cause the wireless device to:
   receive, from a wireless access point, information that indicates transmission times of one or more upcoming trigger frames, TFs;
   perform one or more actions based on the information that indicates the transmission times of the one or more upcoming TFs;
   wherein the information that indicates the transmission times of the one or more upcoming TFs further indicates whether a TF among the at least one of the one or more upcoming TFs will enable the wireless device to satisfy the latency requirement and comprises additional information about the one or more upcoming TFs, the additional information comprises information that indicates whether a traffic category polled by the TF matches that of data to be transmitted, and
   performing the one or more actions comprises the processing circuitry configured to cause the wireless device to:
   receive the TF indicating whether the one or more upcoming TFs will enable the wireless device to satisfy the latency requirement and the data to be transmitted matches the traffic category;
   transmit the data responsive to reception of the TF.

20. A non-transitory computer readable medium storing instructions executable by processing circuitry of a wireless device whereby the wireless device is operable to:
   receive, from a wireless access point, information that indicates transmission times of one or more upcoming trigger frames, TFs;
   perform one or more actions based on the information that indicates the transmission times of the one or more upcoming TFs;
   wherein the information that indicates the transmission times of the one or more upcoming TFs further indicates whether a TF among the at least one of the one or more upcoming TFs will enable the wireless device to satisfy the latency requirement and comprises additional information about the one or more upcoming TFs, the additional information comprises information that indicates whether a traffic category polled by the TF matches that of data to be transmitted, and performing the one or more actions comprises the wireless device being operable to:

receive the TF indicating whether the one or more upcoming TFs will enable the wireless device to satisfy the latency requirement and the data to be transmitted matches the traffic category;

transmit the data responsive to reception of the TF.

21. A wireless access point for a wireless network, the wireless device comprising processing circuitry configured to cause the wireless access point to:

transmit, to one or more wireless devices, information that indicates transmission times of one or more upcoming trigger frames, TFs;

wherein the information that indicates the transmission times of the one or more upcoming TFs further indicates whether a TF among the at least one of the one or more upcoming TFs will enable the one or more wireless devices to satisfy the latency requirement and comprises additional information about the one or more upcoming TFs, and the additional information comprises information that indicates whether a traffic category polled the TF matches that of data to be transmitted the one or more wireless devices.

22. A non-transitory computer readable medium storing instructions executable by processing circuitry of a wireless access point whereby the wireless access point is operable to:

transmit, to one or more wireless devices, information that indicates transmission times of one or more upcoming trigger frames, TFS;

wherein the information that indicates the transmission times of the one or more upcoming TFs further indicates whether a TF among the at least one of the one or more upcoming TFs will enable the one or more wireless devices to satisfy the latency requirement and comprises additional information about the one or more upcoming TFs, and the additional information comprises information that indicates whether a traffic category polled the TF matches that of data to be transmitted the one or more wireless devices.

* * * * *